US011655435B2

(12) United States Patent
Saito et al.

(10) Patent No.: US 11,655,435 B2
(45) Date of Patent: *May 23, 2023

(54) HYDROXY ALKYL CELLULOSE SOIL RELEASE AGENT WITH A CATIONIC GROUP AND A C4—C12 HYDROPHOBIC GROUP

(71) Applicant: KAO CORPORATION, Tokyo (JP)

(72) Inventors: Takanori Saito, Kita-ku (JP); Yoichiro Imori, Wakayama (JP); Akihiro Koyama, Adachi-ku (JP); Yukiko Yamawaki, Wakayama (JP)

(73) Assignee: KAO CORPORATION, Tokyo (JP)

( * ) Notice: Subject to any disclaimer, the term of this patent is extended or adjusted under 35 U.S.C. 154(b) by 281 days.

This patent is subject to a terminal disclaimer.

(21) Appl. No.: 16/769,424

(22) PCT Filed: Dec. 5, 2018

(86) PCT No.: PCT/JP2018/044721
§ 371 (c)(1),
(2) Date: Jun. 3, 2020

(87) PCT Pub. No.: WO2019/111948
PCT Pub. Date: Jun. 13, 2019

(65) Prior Publication Data
US 2020/0299615 A1 Sep. 24, 2020

(30) Foreign Application Priority Data
Dec. 6, 2017 (JP) .............................. JP2017-234710

(51) Int. Cl.
*C11D 3/37* (2006.01)
*C11D 3/22* (2006.01)
*C11D 11/00* (2006.01)

(52) U.S. Cl.
CPC .............. *C11D 3/227* (2013.01); *C11D 3/225* (2013.01); *C11D 11/0017* (2013.01)

(58) Field of Classification Search
CPC ......... C08B 11/14; C08B 1/06; C08B 11/193; C11D 3/227; C11D 11/0017; C11D 3/225; C11D 3/37
See application file for complete search history.

(56) References Cited

U.S. PATENT DOCUMENTS

| 4,000,093 | A | 12/1976 | Nicol et al. |
| 4,663,159 | A | 5/1987 | Brode, II et al. |
| 5,948,744 | A | 9/1999 | Bailley et al. |
| 6,068,697 | A | 5/2000 | Yamamuro et al. |
| 6,121,439 | A | 9/2000 | Kroon |
| 6,833,347 | B1 | 12/2004 | Wang et al. |
| 11,359,166 | B2 * | 6/2022 | Yamawaki ............ D06M 15/09 |
| 11,401,350 | B2 * | 8/2022 | Koyama ............... C08B 11/145 |
| 2004/0151681 | A1 | 8/2004 | Busk et al. |
| 2005/0043415 | A1 | 2/2005 | Munoz et al. |
| 2006/0070294 | A1 | 4/2006 | Spittle |
| 2006/0182703 | A1 | 8/2006 | Arisz et al. |
| 2006/0199742 | A1 | 9/2006 | Arisz et al. |
| 2008/0280807 | A1 | 11/2008 | Grainger et al. |
| 2010/0204079 | A1 | 8/2010 | McAuliffe et al. |
| 2011/0177018 | A1 | 7/2011 | Lipic et al. |
| 2011/0189248 | A1 * | 8/2011 | Baldaro ................ C11D 3/227 424/70.122 |
| 2011/0268778 | A1 | 11/2011 | Dihora et al. |
| 2011/0268802 | A1 | 11/2011 | Dihora et al. |
| 2011/0269658 | A1 | 11/2011 | Dihora et al. |
| 2011/0274627 | A1 | 11/2011 | Alwattari et al. |
| 2011/0318285 | A1 | 12/2011 | Erazo-Majewicz et al. |
| 2013/0130949 | A1 | 5/2013 | Partain, III et al. |
| 2013/0209388 | A1 | 8/2013 | Erazo-Majewicz et al. |
| 2014/0073777 | A1 * | 3/2014 | Miyoshi ................ D21C 9/004 536/56 |
| 2014/0144456 | A1 | 5/2014 | Hirahara et al. |
| 2015/0239993 | A1 | 8/2015 | Miyoshi et al. |
| 2016/0122441 | A1 | 5/2016 | Miyoshi et al. |
| 2017/0233683 | A1 * | 8/2017 | Everaert ............... C11D 3/3723 510/218 |

(Continued)

FOREIGN PATENT DOCUMENTS

| CN | 1209812 A | 3/1999 |
| CN | 101171264 A | 4/2008 |
| CN | 101415809 A | 4/2009 |

(Continued)

OTHER PUBLICATIONS

Neda Beheshti et al, "Interaction behaviors in aqueous solutions of negatively and positively charged hydrophobically modified hydroxyethylcellulose in the presence of an anionic surfactant", Colloids and Surfaces A: Physiochemical and Engineering Aspects. 328. p. 79-89.*

Extended European Search Report dated Aug. 9, 2021 in Patent Application No. 18886444.1, 8 pages.

Extended European Search Report dated Jul. 26, 2021 in Patent Application No. 18885583.7.

Sumei Yao (editor), Basic Chemistry (2nd Edition), Aug. 2017, p. 218, Ocean Press, Beijing, P. R. China.

A.D. Alekseev et al, "Influence of Surfactants on Capacity of Low-Phosphatic Technical Detergents", Belarusian State Technological University, No. 2, 2017, pp. 159-163 (with English abstract).

Combined Office Action, and Search Report dated Nov. 18, 2021 in Russian Patent Application No. 2020118530, 10 pages (with English translation).

(Continued)

*Primary Examiner* — Charles I Boyer
(74) *Attorney, Agent, or Firm* — Element IP, PLC

(57) ABSTRACT

The present invention relates to a soil release agent capable of enhancing cleaning properties for removing a soil during cleaning through treatment of an object, and a soil release composition containing the soil release agent. The soil release agent is a soil release agent including a modified hydroxyalkyl cellulose in which a hydroxyalkyl cellulose is bound to at least one selected from a cationic group and a hydrophobic group including a hydrocarbon group having 4 or more carbon atoms.

15 Claims, No Drawings

(56) References Cited

U.S. PATENT DOCUMENTS

| | | | |
|---|---|---|---|
| 2017/0335242 | A1 | 11/2017 | Eldredge et al. |
| 2020/0392429 | A1 | 12/2020 | Yamawaki et al. |

FOREIGN PATENT DOCUMENTS

| | | | |
|---|---|---|---|
| CN | 101935357 | A | 1/2011 |
| CN | 102391381 | A | 3/2012 |
| CN | 103501758 | | 1/2014 |
| CN | 105142731 | A | 12/2015 |
| EP | 1100851 | B1 | 7/2004 |
| EP | 3722358 | A1 | 10/2020 |
| EP | 3722400 | A1 | 10/2020 |
| EP | 3722497 | A1 | 10/2020 |
| EP | 3722498 | A1 | 10/2020 |
| JP | 3-77201 | B2 | 12/1991 |
| JP | 6-183939 | A | 7/1994 |
| JP | 10-195772 | A | 7/1998 |
| JP | 11-106401 | A | 4/1999 |
| JP | 2000-80564 | A | 3/2000 |
| JP | 2000-178303 | A | 6/2000 |
| JP | 2000178303 | A | 6/2000 |
| JP | 2001-181301 | A | 7/2001 |
| JP | 2003-301376 | A | 10/2003 |
| JP | 2004-519519 | A | 7/2004 |
| JP | 2004189937 | A | 7/2004 |
| JP | 2007-45991 | A | 2/2007 |
| JP | 2007031615 | A | 2/2007 |
| JP | 2007-145903 | A | 6/2007 |
| JP | 2007145903 | A | 6/2007 |
| JP | 2008-156764 | A | 7/2008 |
| JP | 2008-535937 | A | 9/2008 |
| JP | 2013-529644 | A | 7/2013 |
| JP | 5552567 | B1 | 7/2014 |
| JP | 2014-169417 | A | 9/2014 |
| JP | 2015-168666 | A | 9/2015 |
| JP | 2015-227412 | A | 12/2015 |
| JP | 2016-113724 | A | 6/2016 |
| JP | 2019099823 | A | 6/2019 |
| JP | 2019099824 | A | 6/2019 |
| RU | 2479628 | C2 | 4/2013 |
| RU | 2623909 | C2 | 6/2017 |
| WO | WO-9829528 | A2 | 7/1998 |
| WO | WO-2006094582 | A1 | 9/2006 |
| WO | WO-2007120547 | A1 | 10/2007 |
| WO | WO-2011121073 | A1 | 10/2011 |
| WO | WO 2012/021626 | A2 | 2/2012 |
| WO | WO 2013/068771 | A1 | 5/2013 |
| WO | WO 2014/087968 | A1 | 6/2014 |
| WO | WO 2016/077207 | A1 | 5/2016 |
| WO | WO-2017142869 | A1 | 8/2017 |

OTHER PUBLICATIONS

Combined Office Action and Search Report dated Nov. 18, 2021 in Russian Patent Application No. 2020118531, 9 pages (with English translation).

V. M. Sutyagin et al, Khimiya i fizika polymerov: Uchebnoe posobie (Chemistry and Physics of Polymers: a Textbook).—Tomsk: TPU publishers, 2003, 6 pages.

Supplementary European Search Report dated Aug. 18, 2021 in Patent Application No. 18886039.9, 6 pages.

Aug. 18, 2021 Office Action issued in U.S. Appl. No. 16/769,527, 10 pages.

Oct. 4, 2021 Office Action issued in U.S. Appl. No. 16/769,542, 8 pages.

International Search Report, issued in PCT/JP2018/044718, PCT/ISA/210, dated Jan. 15, 2019, with English translation.

International Search Report, issued in PCT/JP2018/044720, PCT/ISA/210, dated Mar. 5, 2019, with English translation.

International Search Report, issued in PCT/JP2018/044722, PCT/ISA/210, dated Feb. 12, 2019, with English translation.

Extended European Search Report dated Aug. 4, 2021 in Patent Application No. 18885732.0, 8 pages.

International Search Report, issued in PCT/JP2018/044721, PCT/ISA/210, dated Feb. 12, 2019.

* cited by examiner

HYDROXY ALKYL CELLULOSE SOIL RELEASE AGENT WITH A CATIONIC GROUP AND A C4—C12 HYDROPHOBIC GROUP

FIELD OF THE INVENTION

The present invention relates to a soil release agent.

BACKGROUND OF THE INVENTION

A polysaccharide derivative is used as a blending component of hair cleansing agent compositions, such as a shampoo, a rinse, a treatment, and a conditioner, or cleaning agent compositions of clothes, and its applications include many divergences.

JP 2000-178303 A (PTL 1) describes, as a laundry finishing agent, a polysaccharide derivative substituted with specified alkyl group, carboxymethyl group, and cationic group.

JP 2015-168666 (PTL 2) describes an aqueous hair cleansing agent containing specified surfactant, cationic group-containing cellulose ether, and glyceryl ether.

JP 2013-529644 A (PTL 3) discloses a personal care composition additive including a specified substantive polymer selected from a polysaccharide and a synthetic polymer containing a cationic monomer.

SUMMARY OF THE INVENTION

The present invention relates to the following <1> and <2>.
<1> A soil release agent including a modified hydroxyalkyl cellulose in which a hydroxyalkyl cellulose is bound to at least one selected from a cationic group and a hydrophobic group including a hydrocarbon group having 4 or more carbon atoms.
<2> A soil release composition containing the soil release agent as set forth in <1>.

DETAILED DESCRIPTION OF THE INVENTION

A soil release agent capable of enhancing cleaning properties for removing a soil during cleaning of clothing or the like is demanded. However, conventional agents are unable to exhibit a sufficient performance.

The present invention relates to a soil release agent capable of enhancing cleaning properties for removing a soil during cleaning through treatment of an object, and a soil release composition containing the soil release agent.

The present inventors have found that the aforementioned problem can be solved by a specified modified hydroxyalkyl cellulose.

In the following description, the "soil release performance" means a performance of enhancing easiness of soil removal during cleaning through treatment of an object.
[Soil Release Agent]

The soil release agent of the present invention includes a modified hydroxyalkyl cellulose in which a hydroxyalkyl cellulose is bound to at least one selected from a cationic group and a hydrophobic group including a hydrocarbon group having 4 or more carbon atoms (hereinafter also referred to simply as "hydrophobic group").

The present inventors have found that when a soil release agent including a specified modified hydroxyalkyl cellulose or a soil release composition containing the soil release agent is treated on an object, such as clothing, the performance of making it easy to remove a soil during cleaning is enhanced. Although a detailed action mechanism thereof is not elucidated yet, it is partly estimated as follows.

In view of the fact that the soil release agent of the present invention has at least one selected from a cationic group and a hydrophobic group, an adsorption capability on the surface of an object, such as clothing, increases, and uniform and appropriate hydrophilicity is provided owing to the soil release agent attached on the surface. As a result, it may be estimated that the performance of making it easy to remove a soil during cleaning is enhanced.

It is preferred that the treatment of the soil release agent of the present invention on an object, such as clothing, is performed before attachment of a soil. Specifically, it is more preferred that the treatment is performed at the same time with cleaning of the object, or during a period of after cleaning until use.

The soil to which the soil release agent of the present invention is objective is any kind of soil inclusive of mud, sweat, oils and fats, and so on. The soil release agent of the present invention is more excellent in the soil release performance against an oily soil among these soils and is suitable as a soil release agent against an oily soil.
<Modified Hydroxyalkyl Cellulose>

The soil release agent of the present invention includes a modified hydroxyalkyl cellulose, and as for the modified hydroxyalkyl cellulose, the hydroxyalkyl cellulose is bound to at least one selected from a cationic group and a hydrophobic group. As for the modified hydroxyalkyl cellulose, only the cationic group may be bound, or only the hydrophobic group may be bound, and it is more preferred that both the cationic group and the hydrophobic group are bound.

From the viewpoint of soil release performance, a hydroxyalkyl group which the hydroxyalkyl cellulose has is preferably at least one selected from a hydroxyethyl group and a hydroxypropyl group, more preferably only a hydroxyethyl group or a hydroxypropyl group, and still more preferably only a hydroxyethyl group. The hydroxyalkyl cellulose may have both a hydroxyethyl group and a hydroxypropyl group, and it preferably has either one of them, and more preferably has only a hydroxyethyl group.

From the viewpoint of soil release performance, the hydroxyalkyl cellulose is preferably hydroxyethyl cellulose (hereinafter also referred to "HEC"), hydroxypropyl cellulose, or hydroxybutyl cellulose, more preferably HEC or hydroxypropyl cellulose, and still more preferably HEC.

In the present invention, from the viewpoint of soil release performance, the modified hydroxyalkyl cellulose of the present invention is preferably modified hydroxyethyl cellulose (hereinafter also referred to as "modified HEC"), modified hydroxypropyl cellulose, or a modified hydroxybutyl cellulose, more preferably modified HEC or modified hydroxypropyl cellulose, and still more preferably modified HEC.

From the viewpoint of solubility, a degree of substitution of the hydroxyalkyl group in the hydroxyalkyl cellulose is preferably 0.1 or more, more preferably 0.5 or more, still more preferably 1 or more, and yet still more preferably 1.5 or more, and from the viewpoint of cleaning performance, it is preferably 10 or less, more preferably 8 or less, still more preferably 5 or less, and yet still more preferably 3 or less.

In the present invention, the degree of substitution of an X group is a molar average degree of substitution of the X group and means a number of substitutions of the X group per the constituent monosaccharide unit of cellulose. For example, the "degree of substitution of the hydroxyethyl group" means an average molar number of the hydroxyethyl group introduced (bound) per mol of the anhydroglucose unit.

In the case where the hydroxyalkyl cellulose has both a hydroxyethyl group and a hydroxypropyl group, the degree of substitution of the hydroxyalkyl group refers to a sum total of the degree of substitution of the hydroxyethyl group and the degree of substitution of the hydroxypropyl group.

(Weight Average Molecular Weight)

In the present invention, from the viewpoint of soil release performance, the weight average molecular weight of the hydroxyalkyl cellulose is preferably 1,000 or more, more preferably 10,000 or more, still more preferably 30,000 or more, yet still more preferably 50,000 or more, even yet still more preferably 70,000 or more, even still more preferably 100,000 or more, and even still more further more preferably 130,000 or more, and from the viewpoint of solubility in the composition, it is preferably 3,000,000 or less, more preferably 1,500,000 or less, still more preferably 1,200,000 or less, yet still more preferably 790,000 or less, even yet still more preferably 600,000 or less, even still more preferably 500,000 or less, and even still more further more preferably 400,000 or less.

In the case where the hydroxyalkyl cellulose is procured as a product and provided for use, published values by a manufacturer may be adopted.

(Cationic Group)

In the present invention, in the modified hydroxyalkyl cellulose of the present invention, a cationic group is preferably bound to a group resulting from eliminating a hydrogen atom from a hydroxy group of the aforementioned hydroxyalkyl cellulose. The aforementioned hydroxy group includes a hydroxy group which the hydroxyalkyl group bound to the cellulose has and a hydroxy group which glucose forming a cellulose structure has (a hydroxy group to which the hydroxyalkyl group is not bound).

The cationic group which the modified hydroxyalkyl cellulose has preferably includes a quaternary ammonium cation, and is preferably represented by the following formula (2-1) or formula (2-2) as a whole.

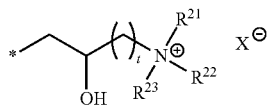

(2-1)

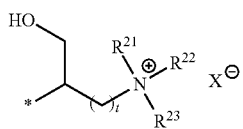

(2-2)

In the formula (2-1) and formula (2-2), $R^{21}$ to $R^{23}$ each independently represent a hydrocarbon group having 1 or more and 3 or less carbon atoms; $X^{1a^-}$ represents an anion; t represents an integer of 0 or more and 3 or less; and * represents a binding position to a group resulting from eliminating a hydrogen atom from a hydroxy group of the hydroxyalkyl cellulose.

$R^{21}$ to $R^{23}$ are each independently preferably a linear or branched hydrocarbon group having 1 or more and 3 or less carbon atoms, and more preferably a methyl group or an ethyl group. Still more preferably, all of $R^{21}$ to $R^{23}$ are a methyl group or an ethyl group, and yet still more preferably, all of $R^{21}$ to $R^{23}$ are a methyl group.

t is preferably an integer of 1 or more and 3 or less, more preferably 1 or 2, and still more preferably 1.

$X^{1a^-}$ is a counter ion of the quaternary ammonium cation, and examples thereof include an alkyl sulfate ion having 1 or more and 3 or less carbon atoms, a sulfate ion, a phosphate ion, a carboxylate ion having 1 or more and 3 or less carbon atoms (e.g., a formate ion, an acetate ion, and a propionate ion), and a halide ion.

Of these, from the viewpoint of easiness of production and easiness of raw material availability, $X^{1a^-}$ is preferably at least one selected from a methyl sulfate ion, an ethyl sulfate ion, a chloride ion, and a bromide ion, and from the viewpoint of solubility in water and chemical stability of the resulting modified hydroxyalkyl cellulose, $X^{1a^-}$ is more preferably a chloride ion.

$X^{1a^-}$ may be used alone or in combination of two or more thereof.

The group represented by the formula (2-1) or formula (2-2) can be obtained by using an introducing agent of the cationic group (hereinafter also referred to as "cationizing agent"). Examples of the cationizing agent include a glycidyltrialkylammonium chloride and a 3-chloro-2-hydroxypropyltrialkylammonium chloride, and from the viewpoint of easiness of raw material availability and chemical stability, a glycidyltrialkylammonium chloride is preferred.

These cationizing agents can be used alone or in combination of two or more thereof.

In the present invention, from the viewpoint of soil release performance, a degree of substitution of the cationic group (hereinafter also referred as "$MS_C$") in the modified hydroxyalkyl cellulose of the present invention is preferably 0.001 or more, more preferably 0.005 or more, still more preferably 0.01 or more, yet still more preferably 0.02 or more, even yet still more preferably 0.05 or more, and even still more preferably 0.07 or more, and it is preferably 1 or less, more preferably 0.7 or less, still more preferably 0.4 or less, yet still more preferably 0.35 or less, even yet still more preferably 0.3 or less, even still more preferably 0.25 or less, even still more further preferably 0.2 or less, even yet still more further preferably 0.15 or less, and even yet still more further preferably 0.1 or less.

The degree of substitution of the cationic group can be measured by the method described in the section of Examples.

(Hydrophobic Group)

In the present invention, as for the modified hydroxyalkyl cellulose, it is preferred that the hydroxyalkyl cellulose is bound to a hydrophobic group including a hydrocarbon group having 4 or more carbon atoms.

From the viewpoint of soil release performance, the hydrocarbon group which the hydrophobic group includes is preferably an alkyl group or an alkenyl group, more preferably an alkyl group, still more preferably a linear or branched alkyl group, and yet still more preferably a linear alkyl group.

From the viewpoint of soil release performance, the carbon number of the hydrocarbon group which the hydrophobic group includes is 4 or more, preferably 6 or more, more preferably 8 or more, and still more preferably 10 or more, and it is preferably 24 or less, more preferably 22 or less, still more preferably 18 or less, yet still more preferably 16 or less, and even yet still more preferably 14 or less.

The hydrophobic group is preferably a group represented by the following formula (1).

  (1)

In the formula (1), Z represents a single bond or a hydrocarbon group having at least one selected from an oxygen atom and a nitrogen atom; $R^1$ represents a hydrocarbon group having 4 or more carbon atoms; and * represents a binding position to a group resulting from eliminating a hydrogen atom from a hydroxy group of a hydroxyalkyl cellulose.

A preferred embodiment of $R^1$ is synonymous with the hydrocarbon group of the aforementioned hydrophobic group.

$R^1$ is defined such that the carbon number of the hydrocarbon group becomes maximum. In consequence, in the formula (1), the atom in Z bound to $R^1$ is, for example, an oxygen atom, a nitrogen atom, carbonate carbon, a carbon atom to which a hydroxy group is bound, or a carbon atom to which a hydroxyalkyl group is bound.

Z represents a single bond or a hydrocarbon group having at least one selected from an oxygen atom and a nitrogen atom. Z is preferably a single bond or a hydrocarbon group having at least an oxygen atom, and more preferably a single bond or a hydrocarbon group having an oxygen atom. The aforementioned hydrocarbon group is preferably an alkylene group; a methylene group of a part of the alkylene group may be substituted with an ether bond, a part of the methylene group may be substituted with a carbonyl group (—C(=O)—), and a part of the methylene group may be substituted with an amide bond; and a hydrogen atom of a part of the alkylene group may be substituted with a hydroxy group, an alkyl group, or a hydroxyalkyl group.

In the case where Z is a hydrocarbon group having an oxygen atom (hereinafter also referred to as "hydrocarbon group (Z)"), the hydrocarbon group (Z) preferably includes an epoxy group-derived group, an oxyglycidyl group-derived group, or group derived from a carboxylic acid (or its anhydride), and from the viewpoint of soil release performance, the hydrocarbon group (Z) more preferably includes an oxyglycidyl group-derived group.

The group represented by the formula (1) more preferably includes any one of groups represented by the following formulae (1-1-1) to (1-4).

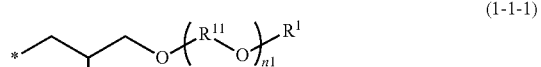  (1-1-1)

  (1-1-2)

  (1-2-1)

  (1-2-2)

  (1-3)

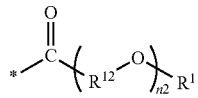  (1-4)

In the formula (1-1-1) to formula (1-4), $R^{11}$ and $R^{12}$ each independently represent an alkylene group having 2 to 4 carbon atoms; $R^1$ is synonymous with $R^1$ in the formula (1); * represents a binding position to a group resulting from eliminating a hydrogen atom from a hydroxy group of the hydroxyalkyl cellulose; n1 represents an addition molar number of —$R^{11}$—O—; n2 represents an addition molar number of —$R^{12}$—O—; and n1 and n2 are each an integer of 0 or more and 30 or less.

A preferred embodiment of $R^1$ in the formula (1-1-1) to formula (1-4) is synonymous with $R^1$ in the formula (1). The groups resulting from eliminating $R^1$ from the formula (1-1-1) to formula (1-4) are preferred embodiments of the hydrocarbon group Z.

$R^{11}$ and $R^{12}$ are each independently preferably an ethylene group or a propylene group, and more preferably an ethylene group. The carbon number of each of $R^{11}$ and $R^{12}$ is preferably 2 or more and 3 or less. In the case where a plurality of each of $R^{11}$ and $R^{12}$ exist, they may be the same as or different from each other, respectively. n1 and n2 are each preferably 20 or less, more preferably 10 or less, still more preferably 5 or less, yet still more preferably 3 or less, and even yet still more preferably 1 or less, and they may be 0 or more, and even still more preferably 0.

In the case where the group represented by the formula (1) contains at least one group selected from a group represented by the formula (1-1-1) and a group represented by the formula (1-1-2), from the viewpoint of soil release performance, an average addition molar number of —$R^{11}$—O— is preferably 20 or less, more preferably 10 or less, still more preferably 5 or less, yet still more preferably 3 or less, and even yet still more preferably 1 or less, and it is preferably 0 or more.

In the case where the group represented by the formula (1) contains a group represented by the formula (1-4), from the viewpoint of soil release performance, an average addition molar number of —$R^{12}$—O— in the formula (1-4) is preferably 20 or less, more preferably 10 or less, still more preferably 5 or less, yet still more preferably 3 or less, and even yet still more preferably 1 or less, and it is preferably 0 or more.

The formula (1-1-1) and formula (1-1-2) are each a group derived from a glycidyl ((poly)alkyleneoxy)hydrocarbyl ether, and Z is a group derived from an oxyglycidyl group or a (poly)alkyleneoxyglycidyl group. The group represented by the formula (1-1-1) or formula (1-1-2) is obtained by using, as an introducing agent (hereinafter also referred to as "hydrophobizing agent") of the hydrophobic group, a glycidyl ((poly)alkyleneoxy)hydrocarbyl ether, preferably a glycidyl ((poly)alkyleneoxy)alkyl ether, and more preferably a glycidyl alkyl ether.

The formula (1-2-1) and formula (1-2-2) are each a group in which Z is derived from an epoxy group. The group represented by each of the formula (1-2-1) and formula (1-2-2) is obtained by using, as a hydrophobizing agent, a terminal-epoxidized hydrocarbon, and preferably a terminal-epoxidized alkane.

The formula (1-3) is the case where the hydrophobic group is bound directly to a group resulting from eliminating a hydrogen atom from a hydroxy group of the hydroxyalkyl cellulose. The group represented by the formula (1-3) is obtained by using, as a hydrophobizing agent, a halogenated hydrocarbon.

The formula (1-4) contains a group in which Z contains a carbonyl group. The group represented by the formula (1-4) is obtained by using, as a hydrophobizing agent, $R^1$—C(=O)—OH, $R^1$—C(=O)-A (A represents a halogen atom), $R^1$—C(=O)—O—C(=O)—$R^1$, or the like.

Of these, from the standpoint that a salt is not formed as a by-product during production of the modified hydroxyalkyl cellulose as well as the viewpoint of soil release performance, the group represented by the formula (1) is preferably the group represented by the formula (1-1-1), formula (1-1-2), formula (1-2-1), or formula (1-2-2), and more preferably the group represented by the formula (1-1-1) or formula (1-1-2).

In the hydrophobic group represented by the formula (1), the total content of the hydrophobic group represented by the formula (1-1-1), the hydrophobic group represented by the formula (1-1-2), the hydrophobic group represented by the formula (1-2-1), the hydrophobic group represented by the formula (1-2-2), the hydrophobic group represented by the formula (1-3), and the hydrophobic group represented by the formula (1-4) is preferably 50 mol %, more preferably 80 mol % or more, and still more preferably 90 mol % or more, and it is 100 mol % or less, and still more preferably 100 mol %.

From the viewpoint of soil release performance, a degree of substitution of the hydrophobic group (hereinafter also referred to as "$MS_R$") in the modified hydroxyalkyl cellulose is preferably 0.0001 or more, more preferably 0.001 or more, still more preferably 0.005 or more, yet still more preferably 0.008 or more, even yet still more preferably 0.01 or more, and even still more preferably 0.015 or more, and from the viewpoint of solubility, it is preferably 1 or less, more preferably 0.4 or less, still more preferably 0.2 or less, yet still more preferably 0.1 or less, even yet still more preferably 0.08 or less, even still more preferably 0.06 or less, even still more further preferably 0.05 or less, even yet still more further preferably 0.04 or less, and even yet still more further preferably 0.03 or less.

In the present invention, from the viewpoint of soil release performance, a ratio ($MS_R/MS_C$) of the degree of substitution ($MS_R$) of the hydrophobic group to the degree of substitution ($MS_C$) of the cationic group in the modified hydroxyalkyl cellulose is preferably 0.001 or more, more preferably 0.005 or more, still more preferably 0.01 or more, and yet still more preferably 0.05 or more, and it is preferably 10 or less, more preferably 5 or less, still more preferably 3 or less, yet still more preferably 2 or less, even still more preferably 1.2 or less, even still more preferably 0.8 or less, even still more further preferably 0.6 or less, even yet still more further preferably 0.5 or less, and even yet still more further preferably 0.3 or less.

In the present invention, in the case where the modified hydroxyalkyl cellulose has both the hydrophobic group and the cationic group, the hydrophobic group and the cationic group may be bound on a different side chain from each other, or the hydrophobic group and the cationic group may exist on one side chain. From the viewpoint of soil release performance, it is preferred that the hydrophobic group and the cationic group are bound to a group resulting from eliminating a hydrogen atom of a different hydroxy group which the hydroxyalkyl cellulose has. That is, it is preferred that the hydrophobic group and the cationic group are bound on a different side chain of the hydroxyalkyl cellulose.

In the case where the modified hydroxyalkyl cellulose has the cationic group and the hydrophobic group on one side chain, it is preferred that the modified hydroxyalkyl cellulose has a group represented by the following formula (3-1) or (3-2).

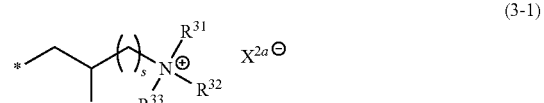

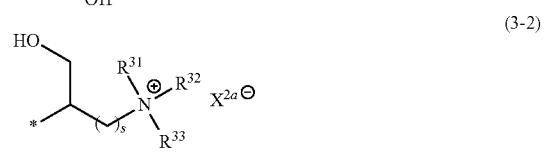

In the formula (3-1) and formula (3-2), $R^{31}$ to $R^{33}$ each independently represent a hydrocarbon group having 1 or more and 24 or less carbon atoms; at least one of $R^{31}$ to $R^{33}$ represents a hydrocarbon group having 4 or more carbon atoms; $X^{2a-}$ represents an anion; s represents an integer of 0 or more and 3 or less; and * represents a binding position to a group resulting from eliminating a hydrogen atom from a hydroxy group of the hydroxyalkyl cellulose.

At least one of $R^{31}$ to $R^{33}$ represents a hydrocarbon group having 4 or more carbon atoms, and it is preferably an alkyl group or an alkenyl group, more preferably an alkyl group, still more preferably a linear or branched alkyl group, and yet still more preferably a linear alkyl group.

From the viewpoint of soil release performance, the carbon number of at least one of $R^{31}$ to $R^{33}$ is 4 or more, preferably 6 or more, more preferably 8 or more, still more preferably 10 or more, and yet still more preferably 12 or more, and it is preferably 24 or less, more preferably 22 or less, still more preferably 18 or less, yet still more preferably 16 or less, and even yet still more preferably 14 or less.

It is preferred that one of $R^{31}$ to $R^{33}$ represents a hydrocarbon group having 4 or more carbon atoms, and two of them are a hydrocarbon group having 1 to 3 carbon atoms. Preferably, the hydrocarbon group having 1 to 3 carbon atoms is a methyl group or an ethyl group; more preferably, two of $R^{31}$ to $R^{33}$ are a methyl group or an ethyl group; and still more preferably, two of $R^{31}$ to $R^{33}$ are a methyl group.

s is preferably an integer of 1 or more and 3 or less, more preferably 1 or 2, and still more preferably 1.

$X^{2a-}$ is a counter ion of the quaternary ammonium cation. Specifically, examples thereof include an alkyl sulfate ion having 1 or more and 3 or less carbon atoms, a sulfate ion, a phosphate ion, a carboxylate ion having 1 or more and 3 or less carbon atoms (e.g., a formate ion, an acetate ion, and a propionate ion), and a halide ion.

Of these, from the viewpoint of easiness of production and easiness of raw material availability, $X^{2a-}$ is preferably at least one selected from a methyl sulfate ion, an ethyl sulfate ion, a chloride ion, and a bromide ion, and from the viewpoint of solubility in water and chemical stability of the resulting modified hydroxyalkyl cellulose, $X^{2a-}$ is more preferably a chloride ion.

$X^{2a-}$ may be alone or may be in combination of two or more thereof.

The modified hydroxyalkyl cellulose having the group represented by the formula (3-1) or formula (3-2) can be, for example, obtained by allowing an introducing agent of the cationic group and the hydrophobic group to act in a production process of the modified hydroxyalkyl cellulose as mentioned later. Preferred examples of the introducing agent include glycidyldimethyllaurylammonium chloride and glycidyldiethyllaurylammonium chloride.

The introducing agent can be used alone or in combination of two or more thereof.

The modified hydroxyalkyl cellulose of the present invention may have an anionic group. From the viewpoint of soil release performance, a ratio ($MS_A/MS_C$) of a degree of substitution of the anionic group (hereinafter also reference to as "$MS_A$") to the degree of substitution of the cationic group in the modified hydroxyalkyl cellulose is preferably 3 or less, more preferably 1.7 or less, still more preferably 1.5 or less, yet still more preferably 1 or less, even yet still more preferably 0.5 or less, and even still more preferably 0.1 or less, and it may be 0 or more, and even yet still more further preferably 0.

From the viewpoint of soil release performance, the $MS_A$ is preferably less than 0.01, and more preferably 0.001 or less.

In the case where the modified hydroxyalkyl cellulose has the anionic group, examples of the anionic group include a carboxymethyl group.

The introduction reaction of the carboxymethyl group (carboxymethylation reaction) is performed by allowing the hydroxyalkyl cellulose to react with a monohalogenated acetic acid and/or its metal salt in the presence of a basic compound.

Specifically, examples of the monohalogenated acetic acid and the monohalogenated acetic acid metal salt include monochloroacetic acid, sodium monochloroacetate, potassium monochloroacetate, sodium monobromoacetate, and potassium monobromoacetate. Such a monohalogenated acetic acid and its metal salt can be used either alone or in combination of two or more thereof.

In the present invention, the modified hydroxyalkyl cellulose may have a glycerol group as a substituent. From the viewpoint of soil release performance, a degree of substitution of the glycerol group is preferably less than 0.5, and more preferably less than 0.1, and it may be 0 or more, and still more preferably 0.

The modified hydroxyalkyl cellulose having a glycerol group is, for example, obtained by allowing a glycerolizing agent to act in a production process of the modified hydroxyalkyl cellulose as mentioned later. Examples of the glycerolizing agent include glycidol, 3-chloro-1,2-propanediol, 3-bromo-1,2-propanediol, glycerin, and glycerin carbonate. Of these, glycidol is preferred from the standpoint that a salt is not formed as a by-product as well as the viewpoint of reactivity.

<Production Method of Modified Hydroxyalkyl Cellulose>

In the present invention, it is preferred that the modified hydroxyalkyl cellulose is obtained by allowing the hydroxyalkyl cellulose to react with at least one selected from the cationizing agent and the hydrophobizing agent, to introduce the cationic group and the hydrophobic group.

It is preferred that all of the introduction reaction of the cationic group (hereinafter also referred to as "cationization reaction") and the introduction reaction of the hydrophobic group (hereinafter also referred to as "hydrophobization reaction") in the coexistence of a basic compound. From the viewpoint of reaction rate in introduction reaction, the basic compound is preferably an alkali metal hydroxide, and more preferably sodium hydroxide or potassium hydroxide.

From the viewpoint of reactivity, the aforementioned reaction may be performed in the presence of a nonaqueous solvent. Examples of the nonaqueous solvent include a polar solvent, such as 2-propanol.

After the reaction, the basic compound can be neutralized with an acid. Examples of the acid include an inorganic acid, such as phosphoric acid, and an organic acid, such as acetic acid.

The resulting modified hydroxyalkyl cellulose may be purified through filtration, washing, or the like, as the need arises.

[Soil Release Composition]

The soil release composition of the present invention contain the aforementioned soil release agent. Examples of other component than the soil release agent which the soil release composition contains include water, an organic solvent, a surfactant, an alkaline agent, a chelating agent, and a dispersant.

From the viewpoint of soil release performance, the content of the soil release agent during using the soil release composition is preferably 0.00001% by mass or more, more preferably 0.00005% by mass or more, still more preferably 0.0001% by mass or more, and yet still more preferably 0.0002% by mass or more, and it is preferably 5% by mass or less, more preferably 2% by mass or less, and still more preferably 1% by mass or less.

The soil release agent or soil release composition of the present invention may also be used as an additive when adding to various cleaning agent compositions for clothing or the like. The soil release composition of the present invention may also be used itself as the cleaning agent composition.

The present invention further discloses the following <1> to <84>.

<1> A soil release agent including a modified hydroxyalkyl cellulose in which a hydroxyalkyl cellulose is bound to at least one selected from a cationic group and a hydrophobic group including a hydrocarbon group having 4 or more carbon atoms.

<2> The soil release agent as set forth in <1>, wherein the modified hydroxyalkyl cellulose is a modified hydroxyalkyl cellulose in which a hydroxyalkyl cellulose is bound to a cationic group and a hydrophobic group including a hydrocarbon group having 4 or more carbon atoms.

<3> The soil release agent as set forth in <1> or <2>, wherein the modified hydroxyalkyl cellulose is modified hydroxyethyl cellulose.

<4> The soil release agent as set forth in any of <1> to <3>, wherein the degree of substitution of the hydroxyalkyl group in the hydroxyalkyl cellulose is 1 or more.

<5> The soil release agent as set forth in any of <1> to <4>, wherein the degree of substitution of the hydroxyalkyl group in the hydroxyalkyl cellulose is 1.5 or more.

<6> The soil release agent as set forth in any of <1> to <5>, wherein the degree of substitution of the hydroxyalkyl group in the hydroxyalkyl cellulose is 3 or less.

<7> The soil release agent as set forth in any of <1> to <6>, wherein the weight average molecular weight of the hydroxyalkyl cellulose is 130,000 or more.

<8> The soil release agent as set forth in any of <1> to <7>, wherein the weight average molecular weight of the hydroxyalkyl cellulose is 1,200,000 or less.

<9> The soil release agent as set forth in any of <1> to <7>, wherein the weight average molecular weight of the hydroxyalkyl cellulose is 790,000 or less.

<10> The soil release agent as set forth in any of <1> to <7>, wherein the weight average molecular weight of the hydroxyalkyl cellulose is 400,000 or less.
<11> The soil release agent as set forth in any of <1> to <10>, wherein the cationic group includes a quaternary ammonium cation.
<12> The soil release agent as set forth in any of <1> to <11>, wherein the cationic group is represented by the formula (2-1) or formula (2-2).

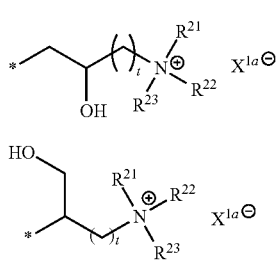

In the formula (2-1) and formula (2-2), $R^{21}$ to $R^{23}$ each independently represent a hydrocarbon group having 1 or more and 3 or less carbon atoms; $X^{1a-}$ represents an anion; t represents an integer of 0 or more and 3 or less; and * represents a binding position to a group resulting from eliminating a hydrogen atom from a hydroxy group of the hydroxyalkyl cellulose.
<13> The soil release agent as set forth in <12>, wherein all of $R^{21}$ to $R^{23}$ are a methyl group or an ethyl group.
<14> The soil release agent as set forth in <12> or <13>, wherein all of $R^{21}$ to $R^{23}$ are a methyl group.
<15> The soil release agent as set forth in any of <12> to <14>, wherein t is 1.
<16> The soil release agent as set forth in any of <12> to <15>, wherein $X^{1a-}$ is at least one selected from a methyl sulfate ion, an ethyl sulfate ion, a chloride ion, and a bromide ion.
<17> The soil release agent as set forth in any of <12> to <15>, wherein $X^{1a-}$ is a chloride ion.
<18> The soil release agent as set forth in any of <1> to <17>, wherein the degree of substitution of the cationic group ($MS_C$) in the modified hydroxyalkyl cellulose is 0.01 or more.
<19> The soil release agent as set forth in any of <1> to <17>, wherein the $MS_C$ is 0.02 or more.
<20> The soil release agent as set forth in any of <1> to <17>, wherein the $MS_C$ is 0.05 or more.
<21> The soil release agent as set forth in any of <1> to <17>, wherein the $MS_C$ is 0.07 or more.
<22> The soil release agent as set forth in any of <1> to <21>, wherein the $MS_C$ is 0.2 or less.
<23> The soil release agent as set forth in any of <1> to <21>, wherein the $MS_C$ is 0.15 or less.
<24> The soil release agent as set forth in any of <1> to <21>, wherein the $MS_C$ is 0.1 or less.
<25> The soil release agent as set forth in any of <1> to <24>, wherein the hydrocarbon group which the hydrophobic group includes is an alkyl group.
<26> The soil release agent as set forth in any of <1> to <25>, wherein the carbon number of the hydrocarbon group which the hydrophobic group includes is 6 or more.
<27> The soil release agent as set forth in any of <1> to <25>, wherein the carbon number of the hydrocarbon group which the hydrophobic group includes is 8 or more.
<28> The soil release agent as set forth in any of <1> to <25>, wherein the carbon number of the hydrocarbon group which the hydrophobic group includes is 10 or more.
<29> The soil release agent as set forth in any of <1> to <28>, wherein the carbon number of the hydrocarbon group which the hydrophobic group includes is 24 or less.
<30> The soil release agent as set forth in any of <1> to <28>, wherein the carbon number of the hydrocarbon group which the hydrophobic group includes is 18 or less.
<31> The soil release agent as set forth in any of <1> to <28>, wherein the carbon number of the hydrocarbon group which the hydrophobic group includes is 16 or less.
<32> The soil release agent as set forth in any of <1> to <28>, wherein the carbon number of the hydrocarbon group which the hydrophobic group includes is 14 or less.
<33> The soil release agent as set forth in any of <1> to <32>, wherein the hydrophobic group is a group represented by the following formula (1).

$$*-Z-R^1 \quad (1)$$

In the formula (1), Z represents a single bond or a hydrocarbon group having at least one selected from an oxygen atom and a nitrogen atom; $R^1$ represents a hydrocarbon group having 4 or more carbon atoms; and * represents a binding position to a group resulting from eliminating a hydrogen atom from a hydroxy group of a hydroxyalkyl cellulose.
<34> The soil release agent as set forth in <33>, wherein Z is a single bond or a hydrocarbon group having an oxygen atom.
<35> The soil release agent as set forth in <33> or <34>, wherein the group represented by the formula (1) includes a group represented by any one of the following formulae (1-1-1) to (1-4).

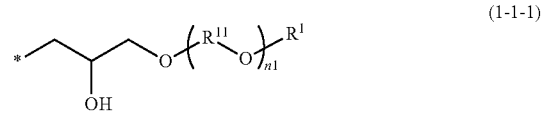

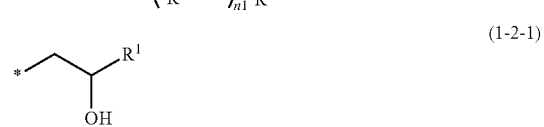

In the formula (1-1-1) to formula (1-4), $R^{11}$ and $R^{12}$ each independently represent an alkylene group having 2 to 4 carbon atoms; $R^1$ is synonymous with $R^1$ in the formula (1); * represents a binding position to a group resulting from eliminating a hydrogen atom from a hydroxy group of the hydroxyalkyl cellulose; n1 represents an addition molar number of —R$^{11}$—O—; n2 represents an addition molar number of —R$^{12}$—O—; and n1 and n2 are each an integer of 0 or more and 30 or less.

<36> The soil release agent as set forth in <35>, wherein R$^{11}$ and R$^{12}$ are each an ethylene group.

<37> The soil release agent as set forth in <35> or <36>, wherein n1 and n2 are each 20 or less.

<38> The soil release agent as set forth in <35> or <36>, wherein n1 and n2 are each 10 or less.

<39> The soil release agent as set forth in <35> or <36>, wherein n1 and n2 are each 5 or less.

<40> The soil release agent as set forth in <35> or <36>, wherein n1 and n2 are each 3 or less.

<41> The soil release agent as set forth in <35> or <36>, wherein n1 and n2 are each 1 or less.

<42> The soil release agent as set forth in any of <35> to <41>, wherein n1 and n2 are each 0 or more.

<43> The soil release agent as set forth in <35> or <36>, wherein n1 and n2 are each 0.

<44> The fabric treatment composition as set forth in any of <35> to <43>, wherein the average addition molar number of each of —R$^{11}$—O— and —R$^{12}$—O— is 10 or less.

<45> The fabric treatment composition as set forth in any of <35> to <43>, wherein the average addition molar number of each of —R$^{11}$—O— and —R$^{12}$—O— is 3 or less.

<46> The fabric treatment composition as set forth in any of <35> to <43>, wherein the average addition molar number of each of —R$^{11}$—O— and —R$^{12}$—O— is 1 or less.

<47> The fabric treatment composition as set forth in any of <35> to <46>, wherein the average addition molar number of each of —R$^{11}$—O— and —R$^{12}$—O— is 0 or more.

<48> The soil release agent as set forth in any of <35> to <47>, wherein the group represented by the formula (1) is the group represented by the formula (1-1-1), formula (1-1-2), formula (1-2-1), or formula (1-2-2).

<49> The soil release agent as set forth in any of <35> to <47>, wherein the group represented by the formula (1) is the group represented by the formula (1-1-1) or formula (1-1-2).

<50> The soil release agent as set forth in any of <1> to <49>, wherein the degree of substitution of the hydrophobic group (MS$_R$) in the modified hydroxyalkyl cellulose is 0.005 or more.

<51> The soil release agent as set forth in any of <1> to <49>, wherein the MS$_R$ is 0.008 or more.

<52> The soil release agent as set forth in any of <1> to <49>, wherein the MS$_R$ is 0.01 or more.

<53> The soil release agent as set forth in any of <1> to <49>, wherein the MS$_R$ is 0.015 or more.

<54> The soil release agent as set forth in any of <1> to <53>, wherein the MS$_R$ is 0.06 or less.

<55> The soil release agent as set forth in any of <1> to <53>, wherein the MS$_R$ is 0.05 or less.

<56> The soil release agent as set forth in any of <1> to <53>, wherein the MS$_R$ is 0.04 or less.

<57> The soil release agent as set forth in any of <1> to <53>, wherein the MS$_R$ is 0.03 or less.

<58> The soil release agent as set forth in any of <1> to <57>, wherein the ratio (MS$_R$/MS$_C$) of the degree of substitution of the hydrophobic group (MS$_R$) to the degree of substitution of the cationic group (MS$_C$) in the modified hydroxyalkyl cellulose is preferably 0.001 or more, more preferably 0.005 or more, still more preferably 0.01 or more, and yet still more preferably 0.05 or more, and it is preferably 10 or less, more preferably 5 or less, still more preferably 3 or less, yet still more preferably 2 or less, even yet still more preferably 1.2 or less, even still more preferably 0.8 or less, even still more further preferably 0.5 or less, and even yet still more further preferably 0.3 or less.

<59> The soil release agent as set forth in any of <1> to <58>, wherein the hydrophobic group and the cationic group are bound to a group resulting from eliminating a hydrogen atom of a different hydroxy group which the hydroxyalkyl cellulose has.

<60> The soil release agent as set forth in any of <1> to <59>, wherein the modified hydroxyalkyl cellulose has the cationic group and the hydrophobic group on one side chain, and the modified hydroxyalkyl cellulose has a group represented by the following formula (3-1) or (3-2).

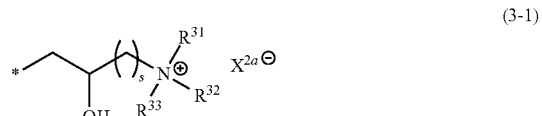

(3-1)

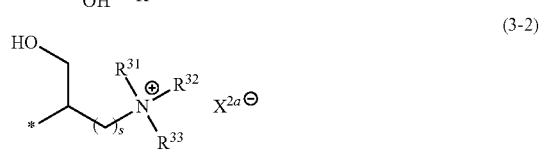

(3-2)

In the formula (3-1) and formula (3-2), R$^{31}$ to R$^{33}$ each independently represent a hydrocarbon group having 1 or more and 24 or less carbon atoms; at least one of R$^{31}$ to R$^{33}$ represents a hydrocarbon group having 4 or more carbon atoms; X$^{2a-}$ represents an anion; s represents an integer of 0 or more and 3 or less; and * represents a binding position to a group resulting from eliminating a hydrogen atom from a hydroxy group of the hydroxyalkyl cellulose.

<61> The soil release agent as set forth in <60>, wherein at least one of R$^{31}$ to R$^{33}$ is an alkyl group having 4 or more carbon atoms.

<62> The soil release agent as set forth in <60> or <61>, wherein at least one of R$^{31}$ to R$^{33}$ has 12 or more carbon atoms.

<63> The soil release agent as set forth in any of <60> to <62>, wherein at least one of R$^{31}$ to R$^{33}$ has 14 or less carbon atoms.

<64> The soil release agent as set forth in any of <60> to <63>, wherein one of R$^{31}$ to R$^{33}$ is a hydrocarbon group having 4 or more carbon atoms, and two of them are a methyl group or an ethyl group.

<65> The soil release agent as set forth in any of <60> to <63>, wherein one of R$^{31}$ to R$^{33}$ is a hydrocarbon group having 4 or more carbon atoms, and two of them are a methyl group.

<66> The soil release agent as set forth in any of <60> to <65>, wherein s is 1.

<67> The soil release agent as set forth in any of <60> to <66>, wherein X$^{2a-}$ is at least one selected from a methyl sulfate ion, an ethyl sulfate ion, a chloride ion, and a bromide ion.

<68> The soil release agent as set forth in any of <60> to <66>, wherein X$^{2a-}$ is a chloride ion.

<69> The soil release agent as set forth in any of <1> to <68>, wherein the ratio (MS$_A$/MS$_C$) of the degree of substitution of the anionic group (MS$_A$) to the degree of substitution of the cationic group (MS$_C$) in the modified hydroxyalkyl cellulose is 0.5 or less.

<70> The soil release agent as set forth in any of <1> to <68>, wherein the MS$_A$/MS$_C$ is 0.1 or less.

<71> The soil release agent as set forth in any of <1> to <70>, wherein the $MS_A/MS_C$ is 0 or more.
<72> The soil release agent as set forth in any of <1> to <68>, wherein the $MS_A/MS_C$ is 0.
<73> The soil release agent as set forth in any of <1> to <72>, wherein the $MS_A$ is 0.4 or less.
<74> The soil release agent as set forth in any of <1> to <72>, wherein the $MS_A$ is less than 0.01.
<75> The soil release agent as set forth in any of <1> to <72>, wherein the $MS_A$ is 0.001 or less.
<76> The soil release agent as set forth in any of <1> to <75>, wherein the degree of substitution of the glycerol group is less than 0.5.
<77> The soil release agent as set forth in any of <1> to <75>, wherein the degree of substitution of the glycerol group is less than 0.1.
<78> The soil release agent as set forth in any of <1> to <77>, wherein the degree of substitution of the glycerol group is 0 or more.
<79> The soil release agent as set forth in any of <1> to <75>, wherein the degree of substitution of the glycerol group is 0.
<80> A soil release composition containing the soil release agent as set forth in any of <1> to <79>.
<81> The soil release composition as set forth in <80>, wherein the soil release composition contains at least one selected from water and an organic solvent.
<82> The soil release composition as set forth in <80> or <81>, wherein the content of the soil release agent during using the soil release composition is preferably 0.00001% by mass or more, more preferably 0.00005% by mass or more, still more preferably 0.0001% by mass or more, and yet still more preferably 0.0002% by mass or more, and it is preferably 5% by mass or less, more preferably 2% by mass or less, and still more preferably 1% by mass or less.
<83> Use of the soil release agent as set forth in any of <1> to <79> or the soil release composition as set forth in any of <80> to <82> as an additive of a cleaning agent composition.
<84> Use of the soli release composition as set forth in any of <80> to <82> as a cleaning agent composition.

EXAMPLES

The measuring methods adopted in Examples and Comparative Examples are as follows.

[Measurement of Degree of Substitution (Molar Average Degree of Substitution (MS))]

Pretreatment 1 g of a powdery modified hydroxyalkyl cellulose was dissolved in 100 g of water, and then, an aqueous solution was charged in a dialytic membrane (Spectra/Por, molecular weight cutoff: 1,000) and subjected to dialysis for 2 days. The resulting aqueous solution was freeze-dried with a freeze dryer (eyela, FDU1100), to obtain a purified modified hydroxyalkyl cellulose.

<Calculation of Mass of Cationic Group by Kjeldahl Method>

200 mg of the purified modified hydroxyalkyl cellulose was accurately metered, to which were then added 10 mL of sulfuric acid and one tablet of a Kjeldahl tablet (manufactured by Merck), followed by undergoing thermal decomposition with a Kjeldahl decomposition apparatus (K-432, manufactured by BUCHI). After completion of decomposition, 30 mL of ion-exchanged water was added to the sample, and the nitrogen content (% by mass) of the sample was determined using an automatic Kjeldahl distillation apparatus (K-370, manufactured by BUCHI), thereby calculating the mass of the cationic group.

<Calculation of Mass of Hydrophobic Group (Alkyl Group) by Zeisel Method>

A calculation method of the mass of an alkyl group that is the hydrocarbon group is hereunder described while referring to the case of Example 1 (using lauryl glycidyl ether as an introducing agent of the hydrocarbon group) as an example. It is also possible to measure the case of using other introducing agent by appropriately selecting a sample for calibration curve (such as an iodoalkane and a hydrocarbon group-introducing agent).

200 mg of the purified cellulose derivative and 220 mg of adipic acid were accurately metered in a 10-mL vial (Mighty Vial No. 3), to which were then added 3 mL of an internal standard solution (tetradecane/o-xylene=1/25 (v/v)) and 3 mL of hydroiodic acid, followed by sealing up. In addition, a sample for calibration curve having 2, 4, or 9 mg of 1-iodododecane added thereto in place of the cellulose derivative was prepared. Each of the samples was heated under a condition at 160° C. for 2 hours by using a block heater (Reacti-ThermIII Heating/Stirring module, manufactured by PIERCE) while stirring with a stirrer chip. The sample was allowed to stand for cooling, and then, an upper layer (o-xylene layer) was recovered and analyzed for the amount of 1-iodododecane through gas chromatography (GC-2010 plus, manufactured by Shimadzu Corporation).

Condition for GC Analysis

Column: Agilent's HP-1 (length: 30 m, liquid phase membrane thickness: 0.25 μL, inner diameter: 32 mm)

Split ratio: 20

Column temperature: 100° C. (2 min)→10° C./min→300° C. (15 min) Injector temperature: 300° C.

Detector: FID

Detector temperature: 330° C.

Amount of implantation: 2 μL

The mass of the alkyl group in the sample was determined from the detection amount of 1-iodododecane obtained through GC.

<Measurement of Mass of Hydroxyalkyl Group>

The mass of the alkyl group was measured in the same manner as in the aforementioned measurement of the mass of the alkyl group by quantitatively determining the hydroxyalkyl group-derived alkyl iodide.

<Calculation of Degree of Substitution (Molar Average Degree of Substitution) of Each of Cationic Group, Hydrophobic Group, and Hydroxyalkyl Group>

From the masses of the aforementioned cationic group and hydrophobic group (alkyl group) and the masses of all of the samples, the mass of the HEC structure was calculated and converted into a substance amount (mol), respectively, thereby calculating the degree of substitution ($MS_C$) of the cationic group and the degree of substitution ($MS_R$) of the alkyl group that is the hydrophobic group.

The raw materials used for the synthesis of the modified hydroxyalkyl cellulose are as follows.

Natrosol 250 GR: HEC (weight average molecular weight: 300,000, degree of substitution of hydroxyethyl group: 2.5, manufactured by Ashland Inc.)

Natrosol 250 HR: HEC (weight average molecular weight: 1,000,000, degree of substitution of hydroxyethyl group: 2.5, manufactured by Ashland Inc.)

Natrosol 250 JR: HEC (weight average molecular weight: 150,000, degree of substitution of hydroxyethyl group: 2.5, manufactured by Ashland Inc.)

IPA: 2-Propanol
LA-EP: Lauryl glycidyl ether, manufactured by Yokkaichi Chemical Co., Ltd.
1,2-Epoxytetradecane, manufactured by Wako Pure Chemical Industries, Ltd.
GMAC: Glycidyl trimethylammonium chloride, "SY-GTA80", manufactured by Sakamoto Yakuhin Kogyo Co., Ltd.

Synthesis Example 1: Synthesis of Modified Hydroxyalkyl Cellulose (M-HEC-1)

90 g of Natrosol 250 GR as the hydroxyalkyl cellulose was charged in a 1-L separable flask, and nitrogen was allowed to pass therethrough. 77.2 g of ion-exchanged water and 414.5 g of IPA were added and stirred for 5 minutes, and then, 10.9 g of a 48% sodium hydroxide aqueous solution was added, followed by further stirring for 15 minutes. Subsequently, 4.5 g of LA-EP was added as the hydrophobizing agent, to undergo a hydrophobization reaction at 80° C. for 5 hours. Furthermore, 10.3 g of GMAC was added as the cationizing agent, to undergo a cationization reaction at 50° C. for 1.5 hours. Thereafter, 10.9 g of a 90% by mass acetic acid aqueous solution was added, and stirring was performed for 30 minutes, to undergo a neutralization reaction.

The resulting suspension liquid was transferred equally into two 500-mL centrifuge tubes and centrifuged with a high-speed cooling centrifuge (CR21G III, manufactured by Hitachi Koki Co., Ltd.) at 1,500G for 40 seconds. A supernatant was removed through decantation, and an 85% by mass IPA aqueous solution in the same amount as that of the removed supernatant was added, to undergo redispersion. Again, the operation of centrifugation and redispersion was repeated, and after performing the third centrifugation, a precipitate was taken out. The resulting precipitate was vacuum-dried at 80° C. for 12 hours by using a vacuum dryer (VR-420, manufactured by Advantec Co., Ltd.) and then crushed with an extreme mill (MX-1200XTM, manufactured by Waring), to obtain powdery modified hydroxyethyl cellulose (M-HEC-1).

The degree of substitution of the cationic group ($MS_C$) and the degree of substitution of the hydrophobic group (alkyl group) ($MS_R$) of the resulting M-HEC-1 were 0.085 and 0.02, respectively.

Synthesis Examples 2 to 10

Powdery modified hydroxyethyl celluloses (M-HEC-2 to M-HEC-10) were obtained by following the same operation as in Synthesis Example 1, except that the hydroxyalkyl cellulose, the amount of LA-EP as the hydrophobizing agent, and the amount of GMAC as the cationizing agent as used were changed to those shown in Table 1.

Synthesis Example 11

Powdery modified hydroxyethyl cellulose (M-HEC-11) was obtained in the same manner as in Synthesis Example 1, except for changing 4.5 g of LA-EP to 12.8 g of 1,2-epoxytetradecane.

Synthesis Example 12: Production of A-HEC

A-HEC was obtained by following the same operation as in Synthesis Example 1, except that the hydrophobizing agent was changed to 25.2 g of 1,2-epoxytetradecane, and the reaction with the cationizing agent was not performed.

Synthesis Example 13: Production of C-HEC

C-HEC was obtained by following the same operation as in Synthesis Example 1, except that the amount of GMAC was changed to 18.2 g, and the reaction with the hydrophobizing agent was not performed.

TABLE 1

| | Modified hydroxyalkyl cellulose | Hydroxyalkyl cellulose | Hydrophobizing agent | | Cationizing agent GMAC | | |
|---|---|---|---|---|---|---|---|
| | | | Kind | (g) | (g) | $MS_R$ | $MS_C$ |
| Synthesis Example 1 | M-HEC-1 | Natrosol 250 GR | LA-EP | 4.5 | 10.3 | 0.02 | 0.085 |
| Synthesis Example 2 | M-HEC-2 | Natrosol 250 HR | LA-EP | 3.7 | 12.3 | 0.02 | 0.085 |
| Synthesis Example 3 | M-HEC-3 | Natrosol 250 JR | LA-EP | 3.5 | 14.1 | 0.02 | 0.085 |
| Synthesis Example 4 | M-HEC-4 | Natrosol 250 GR | LA-EP | 2.0 | 13.4 | 0.01 | 0.085 |
| Synthesis Example 5 | M-HEC-5 | Natrosol 250 GR | LA-EP | 8.9 | 12.3 | 0.04 | 0.085 |
| Synthesis Example 6 | M-HEC-6 | Natrosol 250 GR | LA-EP | 3.4 | 3.0 | 0.02 | 0.02 |
| Synthesis Example 7 | M-HEC-7 | Natrosol 250 GR | LA-EP | 3.2 | 18.4 | 0.02 | 0.14 |
| Synthesis Example 8 | M-HEC-8 | Natrosol 250 GR | LA-EP | 2.1 | 2.6 | 0.01 | 0.02 |
| Synthesis Example 9 | M-HEC-9 | Natrosol 250 GR | LA-EP | 8.5 | 4.8 | 0.04 | 0.02 |
| Synthesis Example 10 | M-HEC-10 | Natrosol 250 GR | LA-EP | 7.8 | 18.3 | 0.04 | 0.14 |
| Synthesis Example 11 | M-HEC-11 | Natrosol 250 GR | 1,2-Epoxy-tetradecane | 12.8 | 10.3 | 0.02 | 0.02 |
| Synthesis Example 12 | A-HEC | Natrosol 250 GR | 1,2-Epoxy-tetradecane | 25.2 | — | 0.05 | — |
| Synthesis Example 13 | C-HEC | Natrosol 250 GR | — | — | 18.2 | — | 0.14 |

Examples 1 to 14 and Comparative
Examples 1 to 3

[Evaluation of Soil Release Performance of Treated Fabric]
(1) Treatment Method of Fabric A 1-L beaker was charged with 0.6 g of an aqueous solution having a whole surfactant concentration of 20 wt % (10 wt % of polyoxyethylene (2) lauryl ether sodium sulfate and 10 wt % of polyoxyethylene (10) lauryl ether), 599.4 g of water having a hardness of 4° dH, and 5 sheets of polyester fabrics having been cut in a regular square of 6 cm×6 cm (a polyester faille, manufactured by Senshoku Shizai K.R.). A propeller for stirring was connected to a motor ("Three-One Motor", manufactured by Shinto Scientific Co., Ltd.) set up in such a manner that the rotation direction changed at every 10 seconds, and the inside of the beaker was stirred at 200 r/min for 5 minutes.

Subsequently, the polyester fabrics were dehydrated with a twin tub washing machine (PS-H45L Type, manufactured by Hitachi, Ltd.) for 1 minute. Thereafter, the polyester fabrics were charged in a 1-L beaker in which 0.36 g of the following soil release composition and 599.64 g of water having a hardness of 4° dH had been charged, and stirring was performed under the same condition as mentioned above. Subsequently, the polyester fabrics were dehydrated with the aforementioned twin tub washing machine for 1 minute and then naturally dried for 12 hours.

<Formulation of Soil Release Composition>

The compositions of the present invention were prepared in blending formulations shown in Table 2. The respective components used are as follows.

M-HEC-1 to M-HEC-11: Modified hydroxyalkyl celluloses obtained in Synthesis Examples 1 to 11
A-HEC: Modified hydroxyethyl cellulose obtained in Synthesis Example 12
C-HEC: Modified hydroxyethyl cellulose obtained in Synthesis Example 13
MC: Methyl cellulose, "Benencel A4C", manufactured by Ashland Inc.
SL100: "SoftCAT™ SL Polymer SL100", manufactured by The Dow Chemical Company (compound in which the group represented by the formula (3-1) is bound to the group resulting from eliminating a hydrogen atom from a hydroxy group of hydroxyethyl cellulose; s=1, $R^{31}$=$C_{12}H_{25}$, $R^{32}$=$R^{33}$=$CH_3$)
HEC: "Natrosol 250 GR", manufactured by Ashland Inc.

(2) Preparation of Soiled Fabric 0.1 mL of the following model sebum artificial soiled liquid was uniformly applied on the polyester fabrics (36 cm$^2$) prepared in the above (1) and then dried by allowing to stand at room temperature for 3 hours.

<Model Sebum Artificial Soiled Liquid>

Oleic acid: 35% by mass
Triolein: 30% by mass
Squalene: 10% by mass
2-Ethylhexyl palmitate: 25% by mass The foregoing mixture was mixed with 0.02% by mass Sudan III, to prepare the model sebum artificial soiled liquid.

(3) Cleaning Test

A 1-L beaker was charged with 0.6 g of an aqueous solution having a whole surfactant concentration of 20 wt % (10 wt % of polyoxyethylene (2) lauryl ether sodium sulfate and 10 wt % of polyoxyethylene (10) lauryl ether), 599.4 g of water having a hardness of 4° dH, and 5 sheets of the soiled fabrics prepared in (2). A propeller for stirring was connected to a motor ("Three-One Motor", manufactured by Shinto Scientific Co., Ltd.) set up in such a manner that the rotation direction changed at every 10 seconds, and the inside of the beaker was stirred at 200 r/min for 5 minutes. Subsequently, the washed polyester fabrics were dehydrated with the aforementioned twin tub washing machine for 1 minute. Thereafter, the polyester fabrics were charged in a 1-L beaker in which 600 g of water having a hardness of 4° dH had been charged, and stirring was performed under the same condition as mentioned above. Subsequently, the polyester fabrics were dehydrated with the aforementioned twin tub washing machine for 1 minute and then naturally dried for 12 hours.

(4) Evaluation of Cleaning Rate

Reflectances of a polyester raw fabric before soiling and polyester fabrics before and after cleaning at 460 nm were measured with a spectrophotometer (SE-2000, manufactured by Nippon Denshoku Industries Co., Ltd.), and the cleaning rate (%) was determined according to the following equation.

Cleaning rate (%)=100×[{(Reflectance after cleaning)−(Reflectance before cleaning)}/{(Reflectance of raw fabric)−(Reflectance before cleaning)}]

In addition, in the treatment method of fabric of the above (1), a cleaning rate enhancement (%) was determined from a difference of the cleaning rate after performing the cleaning test of the soiled fabric from the blank having the soil release composition of 0 g according to the following equation. The higher the cleaning rate enhancement, the more excellent the soil release performance is.

Cleaning rate enhancement (%)=[{Cleaning rate (%) after treatment with soil release agent}−{Cleaning rate (%) of blank}]

TABLE 2

| | Soil release composition | | |
| | Modified hydroxyalkyl cellulose | Ion-exchanged water | Cleaning |
| | Kind | Blending amount (parts by mass) | Blending amount (parts by mass) | rate enhancement (%) |
|---|---|---|---|---|
| Example 1 | M-HEC-1 | 1 | 99 | 42 |
| Example 2 | M-HEC-2 | 1 | 99 | 44 |
| Example 3 | M-HEC-3 | 1 | 99 | 39 |
| Example 4 | M-HEC-4 | 1 | 99 | 42 |
| Example 5 | M-HEC-5 | 1 | 99 | 38 |
| Example 6 | M-HEC-6 | 1 | 99 | 41 |
| Example 7 | M-HEC-7 | 1 | 99 | 42 |
| Example 8 | M-HEC-8 | 1 | 99 | 43 |
| Example 9 | M-HEC-9 | 1 | 99 | 38 |
| Example 10 | M-HEC-10 | 1 | 99 | 44 |
| Example 11 | M-HEC-11 | 1 | 99 | 36 |
| Example 12 | A-HEC | 1 | 99 | 33 |
| Example 13 | C-HEC | 1 | 99 | 32 |
| Example 14 | SL100 | 1 | 99 | 30 |
| Comparative Example 1 | — | 0 | 100 | 0 |
| Comparative Example 2 | HEC | 1 | 99 | 12 |
| Comparative Example 3 | MC | 1 | 99 | 8 |

As is clear from Table 2, it has been clarified that the attachment of the sebum soil is inhibited, and the soil release performance is enhanced through the treatment with the soil release composition containing at least one of the cationic group and the hydrophobic group according to the present invention.

On the other hand, according to the HEC having neither the cationic group nor the hydrophobic group, the sufficient soil release performance was not obtained.

In addition, according to the modified hydroxyalkyl cellulose having both the cationic group and the hydrophobic group, the cationic group and the hydrophobic group being bound on a different side chain from each other, the high soil release performance was obtained as compared with the SL100 having a hydrophobic group as the alkyl group of the quaternary alkyl ammonium.

Example 15 and Comparative Example 4

[Evaluation of Soil Release Performance of Treated Hard Surface]

(1) Treatment Method of Hard Surface

In a container in which 1 g of the soil release composition as described in Table 3 and 199 g of water having a hardness of 4° dH were charged, a previously cleaned substrate was dipped and treated at 25° C. and 110 r/min for 15 minutes. Then, the substrate was lifted up and naturally dried, to obtain a treated substrate. The substrate used is as follows.

Stainless steel: SUS430, 20×50 mm, manufactured by Engineering Test Service, Co., Ltd.

Polyvinyl chloride: PVC, 25×37 mm, manufactured by Engineering Test Service, Co., Ltd.

PA nylon: PA 6nylon, 25×37 mm, manufactured by Engineering Test Service, Co., Ltd.

(2) Preparation of Soiled Substrate

Using a micropipette, 50 μL of the model sebum artificial soiled liquid used in the aforementioned preparation of soiled fabric was poured in a central part of the aforementioned treated substrate as disposed horizontally and then dried at room temperature for 30 minutes, to obtain a soiled substrate.

(3) Cleaning Test

A 200-mL beaker was charged with 0.012 g of an aqueous solution having a whole surfactant concentration of 20 wt % (10 wt % of polyoxyethylene (2) lauryl ether sodium sulfate and 10 wt % of polyoxyethylene (10) lauryl ether), 11.988 g of water having a hardness of 4° dH, and the aforementioned soiled substrate. After dipping for 1 minute, the resulting substrate was cleaned while stirring at 50 r/min for 10 seconds, and the test piece was then lifted up and naturally dried.

(4) Evaluation of Cleaning Rate

The model sebum remaining on the cleaned substrate obtained in the above (3) was extracted with 4.5 g of a mixed solvent of methanol and chloroform in a volume ratio of 1/1. An absorbance of the extract at a wavelength of 510 nm was measured with an absorbance meter ("U-2910", manufactured by Hitachi, Ltd.), and the cleaning rate (%) was determined according to the following equation.

Cleaning rate (%)=$k$×(Absorbance of extract)+100

In the equation, the constant k varies with the experiment condition, and therefore, "−1017.6" that is a value as previously determined from a calibration curve between the cleaning rate and the absorbance was adopted.

In addition, in the treatment method of fabric of the above (1), a cleaning rate enhancement (%) was determined from a difference of the cleaning rate after performing the cleaning test of the soiled fabric from the blank having the soil release composition of 0 g according to the following equation. The higher the cleaning rate enhancement, the more excellent the soil release performance is.

Cleaning rate enhancement (%)=[{Cleaning rate (%) after treatment with soil release agent}−{Cleaning rate (%) of blank}]

TABLE 3

| | Blending amount of soil release composition (parts by mass) | | Cleaning rate enhancement (%) | | |
|---|---|---|---|---|---|
| | M-HEC-2 | Ion-exchanged water | Stainless steel | Polyvinyl chloride | PA nylon |
| Example 15 | 1 | 99 | 42 | 39 | 38 |
| Comparative Example 4 | 0 | 100 | 0 | 0 | 0 |

As is clear from Table 3, it has been clarified that the attachment of the sebum soil is inhibited, and the soil release performance is enhanced through the treatment of the hard surface, such as stainless steel, polyvinyl chloride, and PA nylon, with the soil release composition containing at least one of the cationic group and the hydrophobic group according to the present invention.

INDUSTRIAL APPLICABILITY

By treating an object with the soil release agent or soil release composition of the present invention, an extremely excellent effect for enhancing the soil release performance can be provided. The soil release agent of the present invention may also be used as an additive when adding to various cleaning agent compositions for clothing or the like. Furthermore, the soil release composition of the present invention may be used as various cleaning agent compositions or may also be separately added to these cleaning agent compositions.

The invention claimed is:

1. A soil release agent comprising a modified hydroxyalkyl cellulose in which a hydroxyalkyl cellulose is bound to a cationic group and a hydrophobic group,
    wherein a degree of substitution of an anionic group in the modified hydroxyalkyl cellulose is 0.4 or less, and
    wherein the hydrophobic group includes a hydrocarbon group having 4 to 12 carbon atoms and the hydrophobic group is represented by formula (1):

*—Z—R¹  (1)

wherein:
    Z represents a single bond or a hydrocarbon group having at least one selected from an oxygen atom and a nitrogen atom;
    R¹ represents a hydrocarbon group having 4 to 12 carbon atoms; and
    * represents a binding position to a group resulting from eliminating a hydrogen atom from a hydroxy group of a hydroxyalkyl cellulose.

2. The soil release agent according to claim 1, wherein the hydrophobic group represented by the formula (1) includes at least one selected from a hydrophobic group represented by the following formula (1-1-1), a hydrophobic group represented by the following formula (1-1-2), a hydrophobic group represented by the following formula (1-2-1), a hydrophobic group represented by the following formula (1-2-2), a hydrophobic group represented by the following formula (1-3), and a hydrophobic group represented by the following formula (1-4):

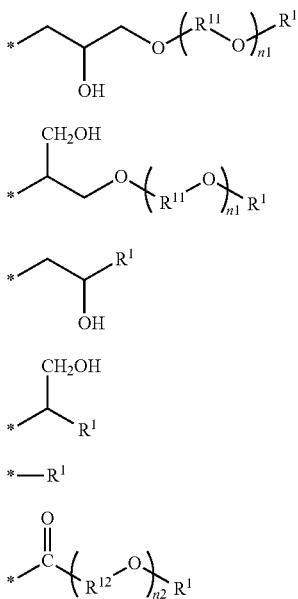

(1-1-1)

(1-1-2)

(1-2-1)

(1-2-2)

(1-3)

(1-4)

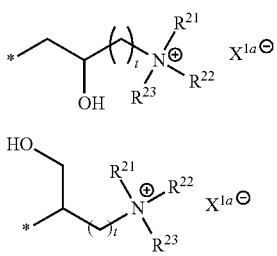

wherein:
R¹¹ and R¹² each independently represent an alkylene group having 2 to 4 carbon atoms;
$R^1$ is synonymous with $R^1$ in the formula (1);
* represents a binding position to a group resulting from eliminating a hydrogen atom from a hydroxy group of the hydroxyalkyl cellulose;
n1 represents an addition molar number of —R¹¹—O—;
n2 represents an addition molar number of —R¹²—O—; and
n1 and n2 are each 0 or more and 30 or less.

3. The soil release agent according to claim 1, wherein the cationic group includes a quaternary ammonium cation.

4. The soil release agent according to claim 1, wherein the cationic group is represented by the formula (2-1) or formula (2-2):

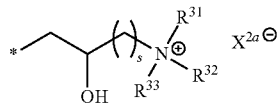

(2-1)

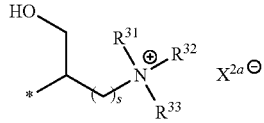

(2-2)

wherein,
$R^{21}$ to $R^{23}$ each independently represent a hydrocarbon group having 1 or more and 3 or less carbon atoms;
$X^{1a-}$ represents an anion;
t represents an integer of 0 or more and 3 or less; and
* represents a binding position to a group resulting from eliminating a hydrogen atom from a hydroxy group of the hydroxyalkyl cellulose.

5. The soil release agent according to claim 1, wherein the modified hydroxyalkyl cellulose has a group represented by the following formula (3-1) or (3-2):

(3-1)

(3-2)

wherein,
$R^{31}$ to $R^{33}$ each independently represent a hydrocarbon group having 1 or more and 24 or less carbon atoms;
at least one of $R^{31}$ to $R^{33}$ represents a hydrocarbon group having 4 or more carbon atoms;
$X^{1a-}$ represents an anion;
s represents an integer of 0 or more and 3 or less; and
* represents a binding position to a group resulting from eliminating a hydrogen atom from a hydroxy group of the hydroxyalkyl cellulose.

6. The soil release agent according to claim 1, wherein a weight average molecular weight of the hydroxyalkyl cellulose is 1,000 or more and 3,000,000 or less.

7. The soil release agent according to claim 1, wherein a degree of substitution of the hydrophobic group including a hydrocarbon group having 4 to 12 carbon atoms in the modified hydroxyalkyl cellulose is 0.0001 or more and 1 or less.

8. The soil release agent according to claim 1, wherein a degree of substitution of the cationic group in the modified hydroxyalkyl cellulose is 0.001 or more and 1 or less.

9. A soil release composition comprising the soil release agent according to claim 1.

10. The soil release agent according claim 1, wherein the carbon number of the hydrocarbon group which the hydrophobic group includes is 6 or more and 12 or less.

11. The soil release agent according to claim 1, wherein a ratio ($MS_R/MS_C$) of the degree of substitution ($MS_R$) of the hydrophobic group to the degree of substitution ($MS_C$) of the cationic group in the modified hydroxyalkyl cellulose is 0.001 or more and 10 or less.

12. A composition, comprising:
the soil release agent according to claim 1.

13. A cleaning agent, comprising:
the soil release agent composition according to claim 9.

14. A process, comprising:
treating an object with the soil release agent according to claim 1.

15. A process, comprising:
treating an object with the soil release composition according to claim 9.

* * * * *